Oct. 9, 1934.   F. S. HAAS   1,976,124
MACHINE TOOL
Filed Sept. 11, 1930   3 Sheets-Sheet 1

Inventor
FREDERICK S. HAAS
By AHParsons
Attorney

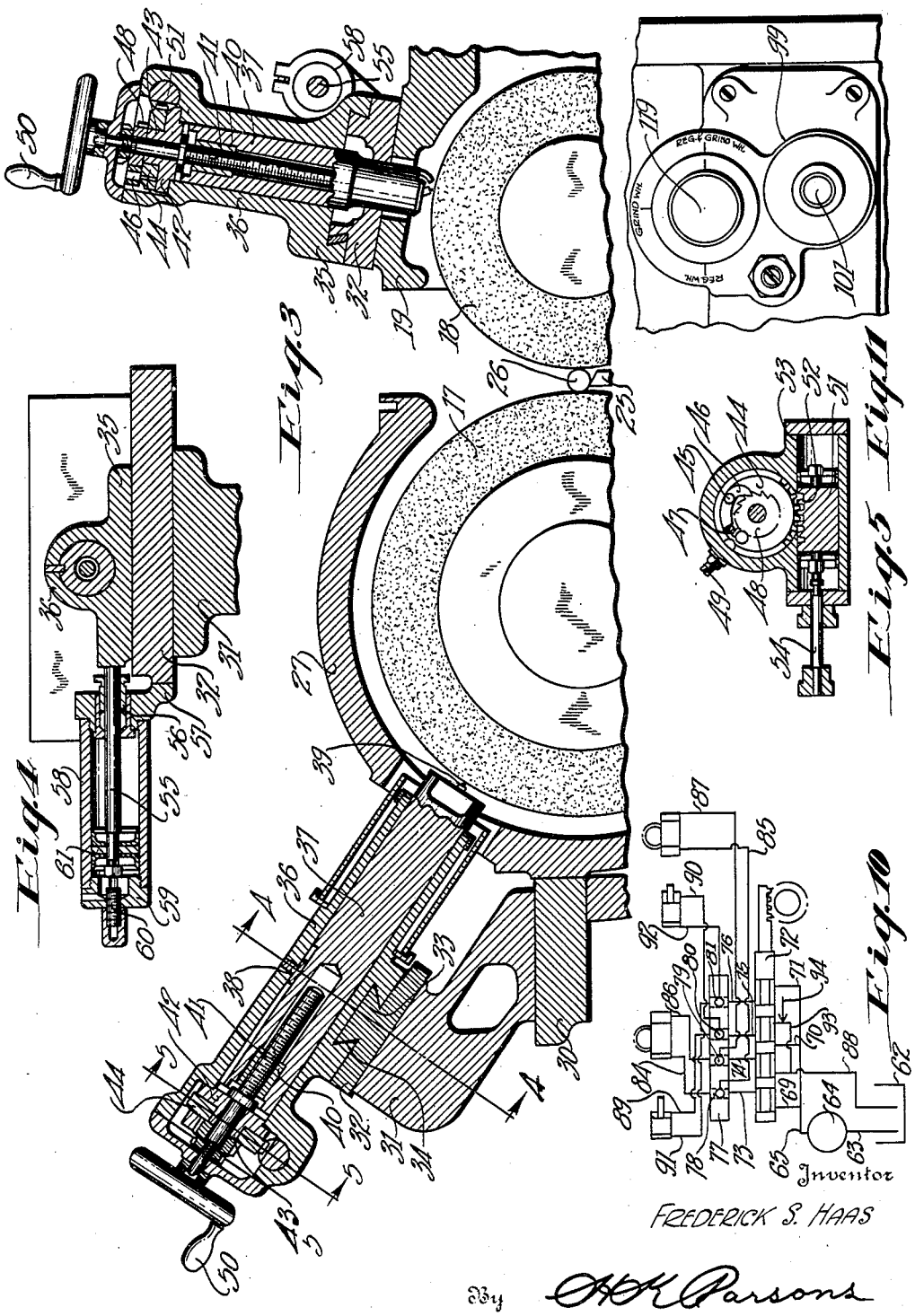

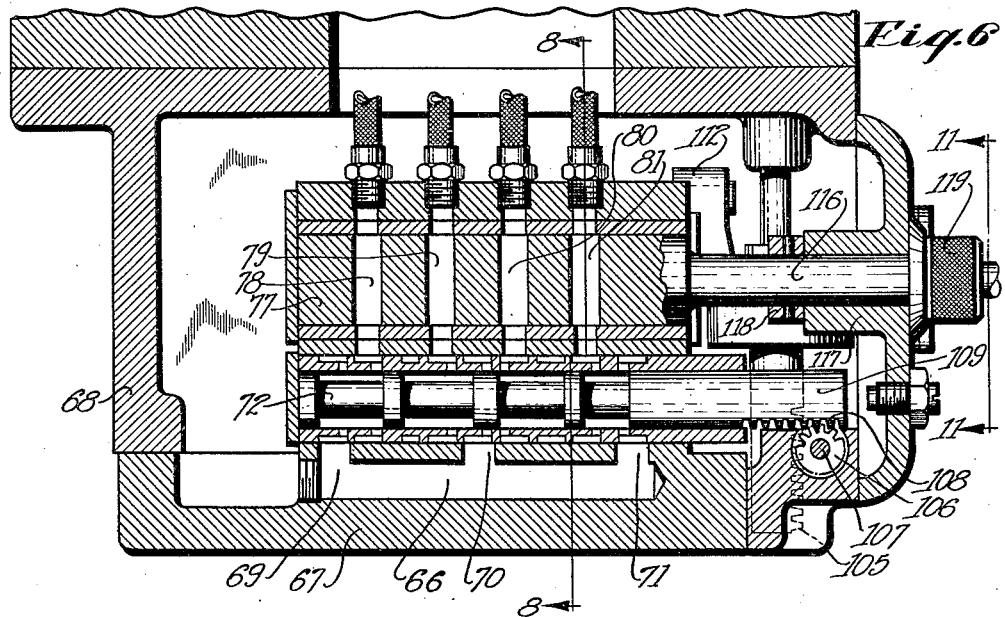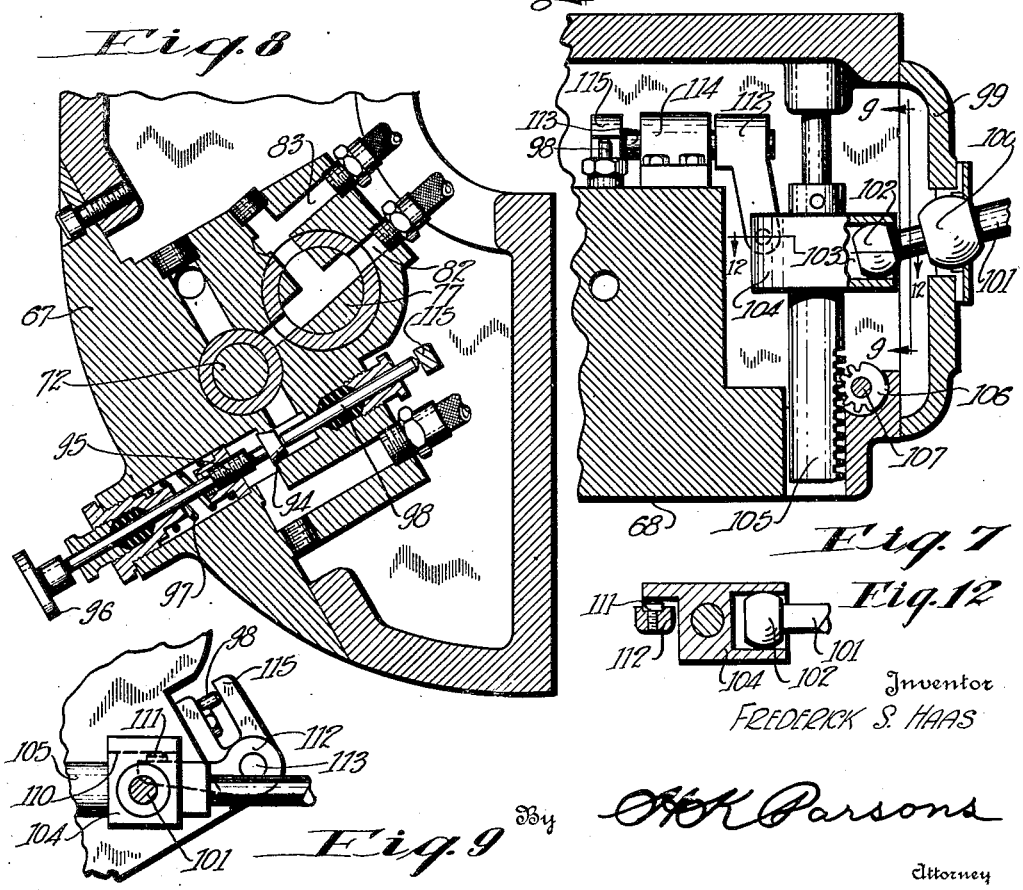

Patented Oct. 9, 1934

1,976,124

UNITED STATES PATENT OFFICE 1,976,124

MACHINE TOOL

Frederick S. Haas, Cincinnati, Ohio, assignor to Cincinnati Grinders Incorporated, Cincinnati, Ohio, a corporation of Ohio Application September 11, 1930, Serial No. 481,268

11 Claims. (Cl. 125—11)

This invention relates to improvements in machine tool structures and especially to improvements in means for controlling the movements of reciprocating parts of a machine tool organization.

One of the principal objects of the present invention is the provision of an improved control mechanism for controlling the several movements of individual units and members remote from the operator and the control means.

Another object of the invention is the provision of an improved single control mechanism for jointly and selectively controlling the actuation of individual movable members of a machine tool organization.

A further and specific object of the invention is the provision of improved means controlling the movements of retrueing tools for trueing the active faces of the grinding and regulating wheels of a centerless grinder which control means jointly or selectively determines actuation of the said several trueing mechanisms.

Other objects and advantages of the present invention should be readily understood by reference to the following specification considered in conjunction with the accompanying drawings and it is to be understood that any modifications may be made in the exact structural details there shown and described within the scope of the appended claims without departing from or exceeding the spirit of the invention.

In the drawings:

Figure 3 is a longitudinal sectional view through the machine showing the several members in their operative positions.

Figure 4 is a sectional view taken on line 4—4 of Figure 3.

Figure 5 is a sectional view taken on line 5—5 of Figure 3.

Figure 6 is a sectional view taken on line 6—6 of Figure 1.

Figure 7 is a sectional view taken on line 7—7 of Figure 1.

Figure 8 is a sectional view taken on line 8—8 of Figure 6.

Figure 9 is a view as seen from line 9—9 of Figure 7 showing the rapid traverse control forming a detail of this invention.

Figure 10 is an hydraulic circuit diagram illustrating the hydraulic circuit employed with this invention.

Figure 11 is a fragmentary elevational view as seen from line 11—11 on Figure 6.

Figure 12 is a sectional view as seen from line 12—12 of Figure 7.

Figure 1:
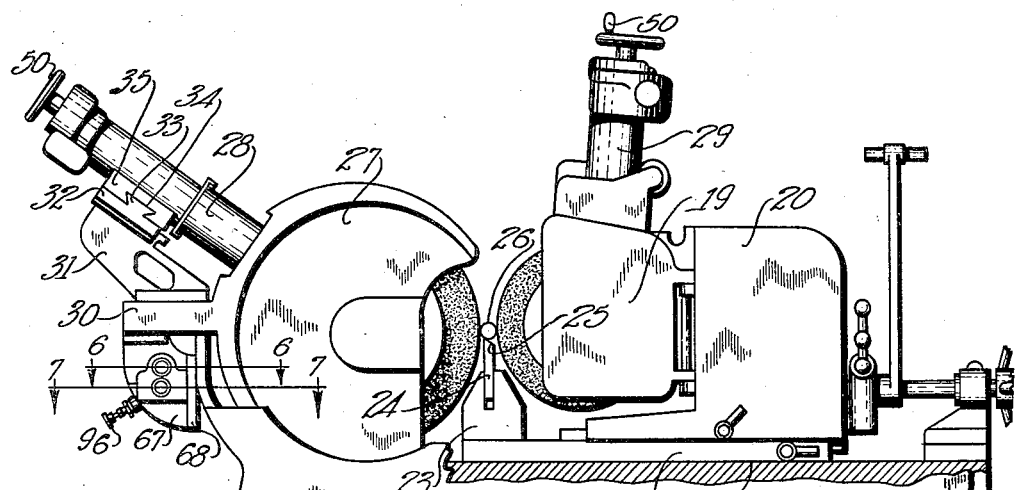
Figure 1 is a front elevational view of a machine embodying the improvements of this invention.
Figure 2:
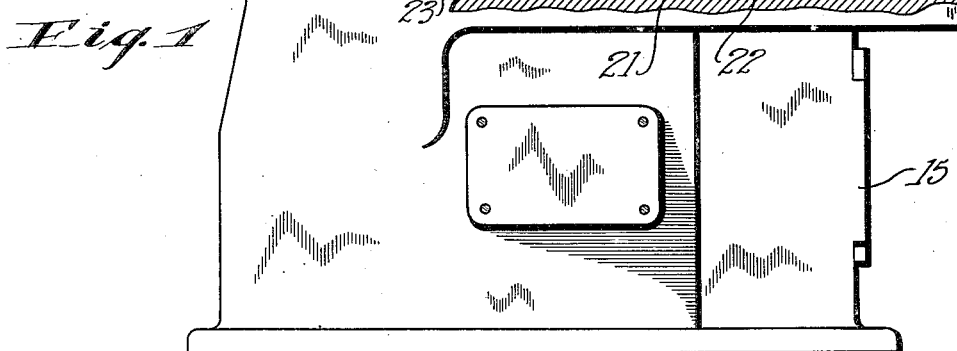
Figure 2 is a fragmentary top plan view of the machine shown in Figure 1.

To obtain the proper surface and finish on work pieces tooled in a grinding machine it is desirable and necessary to have a clean, sharp cutting face on the said grinding wheel. In a centerless grinder a pair of opposed grinding and regulating wheels are employed, the former for effecting a stock removal from the work while the latter frictionally engages the work to control its rotation and each wheel is preferably formed of abrasive material. The face of the regulating wheel, to properly perform its function, similar to the grinding wheel, must have a clean, true face to properly frictionally engage and control the work. It is, therefore, necessary that a plurality of trueing mechanisms be employed, one for the grinding wheel and the other for the regulating wheel. To illustrate the invention there has been shown and disclosed in the drawings a centerless grinder which embodies the improvements of this invention. It is to be understood, however, that the invention is not confined to a trueing mechanism but may be employed for controlling the movements of other machine tool parts or units which are remote from one another and which may be in an inaccessible position relative to the operator.

Throughout the several views of the drawings similar reference characters have been employed to denote the same or similar parts.

The reference numeral 15 indicates the bed of a centerless grinder having rising therefrom at one end thereof a bearing 16 rotatably supporting the spindle which carries the grinding wheel 17 for rotating said wheel at a high or grinding rate of speed in a clockwise direction as viewed in Figure 1. Opposed to the grinding wheel 17 is a regulating wheel 18 rotatable in a clockwise direction at a relatively slow work controlling rate of speed. The spindle of the regulating wheel 18 is rotatably journaled in a housing 19 forming a part of the regulating wheel unit which terminates in upper slide 20 supported by lower slide 21. The lower slide 21 in turn is received in suitable ways 22 formed on the bed 15. The said lower slide 21 supports at its forward end a work rest block 23 supporting a work rest blade 24 having an active beveled top 25 inclining toward the face of the regulating wheel 18 and forming a work receiving trough therewith for the work 26. The active faces of the wheels are spaced from one another to provide a grinding throat in which the work to be operated upon is mounted and subtending which throat is the work rest blade 24.

The grinding wheel 17 has substantially enclosing it a housing or guard 27 supporting a trueing mechanism 28 while the housing 19 supports a similar trueing mechanism 29 for trueing the active face of the regulating wheel 18. The trueing mechanisms 28 and 29 are substantially duplicates of one another and it is deemed sufficient if but one of them be described in detail. Accordingly, the grinding wheel housing 27 has extending from it a ledge or shelf 30 having secured thereto the base plate 31 supporting a slideway 32. The said slideway 32 has formed thereon a dove-tailed guide 33 received in a correspondingly shaped dove-tailed groove 34 formed in slide member 35. The slide member 35 has integral therewith a tubular housing 36 enclosing a barrel 37 having a splined connection at 38 with the sleeve 36 so that relative rotative movement between the sleeve and barrel are precluded. The said barrel 37 carries at its inner end a diamond or other trueing tool 39 and at its upper end a nut 40 receiving the threaded portion of adjusting screw 41 rotatably journaled in a bearing 42. A stud 43 extends from the bearing 42 and has loosely mounted on it a segmental gear 44. Referring to Figure 5, it will be noted that the segmental gear 44 has pivotally mounted at 45 a pawl 46 actuable by a spring 47 about the pivot 45 to maintain engagement with the teeth of a ratchet 48 keyed or otherwise secured to the adjusting screw 41. A throw-out member 49 extends through the housing or sleeve 36 for disengaging the pawl from the ratchet when desired. A hand wheel or the like 50 is secured to the outer reduced end of the adjusting screw 41 for rotating said screw and axially adjusting the barrel 37 relative to the housing or sleeve 36 and when the pawl 46 is held out of engagement with the ratchet 48 by the throw-out member 49 the hand wheel may be rotated in either direction for correspondingly actuating the barrel 37.

For automatically rotating the adjusting screw 41 and feeding the diamond 39 toward the grinding wheel there has been provided a piston 51 having rack teeth 52 formed in one side thereof meshing with the teeth of segmental gear 44. The said piston 51 is enclosed within a cylinder 53 formed integral with the housing or sleeve 36. An adjusting screw 54 is threaded into one end of the cylinder 53 for limiting the movement of the piston 51 in one direction through its cylinder 53 and determining the number of teeth on the ratchet 48 to be picked up by the pawl 46. This piston is actuated by hydraulic pressure, as will later appear.

For traversing the diamond or trueing tool 39 across the face of the wheel the slide 35 has secured to it one end of a piston rod 55 guided by packing gland or the like 56 carried by bracket 57 secured to guide member 32. The bracket 57 in addition carries one end of a cylinder 58 closed at its opposite end by a cylinder head 59 which carries an adjusting screw 60. A piston 61 is enclosed within the cylinder 58 and is secured to the inner end of the piston rod 55 for actuating the said rod and slide 35 secured thereto. The adjusting screw 60 abuts the piston 61 and limits its movement in one direction. This piston 61, similar to piston 51, is actuated through its cylinder by hydraulic pressure.

In Figure 10 there has been diagrammatically illustrated the hydraulic circuit for controlling the movements of the pistons 51 and 61 while in Figures 6 to 9 inclusive the mechanical details and construction of the valves and control members are illustrated. A suitable tank or sump 62 is provided for containing the hydraulic medium, preferably oil, utilized for actuating the pistons, which medium is drawn through suction pipe 63 by a pump 64 and discharged therefrom, under pressure, into conduit 65. Conduit 65 extends to in-take port 66 formed in valve cage 67 secured to the housing 68 in turn carried by the shelf or ledge 30 extending from the grinding wheel guard or housing 27. The in-take port 66 connects through ports 69, 70 and 71 with several ports controlled by slide valve 72 slidably actuable through the valve cage 67. As shown diagrammatically in Figure 10 and structurally in Figures 6 and 8 the slide valve 72 communicates by way of ports 73, 74, 75 and 76 with a distributor valve 77 rotatably mounted in the valve cage 67 for connecting the pressure source and exhaust with either of the trueing mechanisms 28 or 29 for independent actuation of said mechanisms or for connecting the said trueing mechanisms simultaneously with the pressure and exhaust for simultaneous actuation thereof. As seen in Figure 8 the distributor valve 77 has passages therein extending at right angles to one another. As many passages as desired may be provided in the valve 77 but as here shown the said valve is formed with four sets of passages 78, 79, 80 and 81. With the distributor valve in the position shown in Figure 8 the passages each connect with similar ports 82 and 83 thereby directing the hydraulic pressure from the slide valve 72 to the piston cylinders of each trueing mechanism simultaneously. The passages 78 to 81 inclusive each resemble, as seen in Figure 8, a T and if the said distributor valve 77 were given a quarter revolution in a counter clockwise direction, or to the left, it would connect the passages therein now connected with ports 82 with the ports 83 causing the fluid to make a right hand turn into ports 83 to one only of the trueing mechanisms, while if the said distributor valve were given a further quarter revolution in a counter clockwise direction the ports 78 to 81 inclusive would be cut-off from the ports 83 and connected only with the ports 82 thereby actuating the other of the hydraulic trueing structures. A still further quarter revolution of the distributor valve 77 in a counter clockwise direction would disconnect both ports 82 and 83 from the pressure source thereby holding the trueing mechanisms stationary.

Referring to Figure 10 it will be noted that port 78 of the distributor valve 77 is coupled through conduits 84 and 85 with one end of cylinders 53 while the other end of the said cylinders are coupled through conduits 86 and 87 with the ports 79 which connects through port 74 and slide valve 72 with the discharge port 88 to convey the medium to the tank or sump 62. The port 80 of the distributor valve 77 connects with one end of the traverse cylinders 58 by way of conduits 89 and 90 while the other ends of the said cylinders are connected through conduits 91 and 92 with the port 81 of the distributor valve 77 which through port 76 and slide valve 72 and conduit 93 connects with the exhaust conduit 34 for discharge to the tank or sump 62.

By reference to Figure 10, it will be noted that the exhaust conduit 88 coupled with the end of in-feed cylinders 53 is unrestricted thereby permitting a fast or unrestricted movement of the piston 51 to effect a proper in-feed movement of the diamond or trueing tool 39 into the grinding wheel while the branch discharge conduit 93 is controlled by an adjustable needle valve 94 for adjustably determining the rate of movement of the diamond or trueing tool across the face of the grinding wheel. By reference to Figure 8, it will be noted that the said valve 94 is adjustable by a screw 95 secured to its end 96 for varying the tension of the spring 97 against the said valve. A slide rod 98 is slidably carried by the valve cage 67 and has one end abutting the valve for actuating same against the tension of spring 97 for uncovering the port controlled thereby and permitting a rapid movement of the pistons 61 through the cylinders 58.

The valve cage housing 68 has secured to its forward wall a cap 99 forming a bearing for ball 100 secured to valve shifter rod 101 intermediate its ends whereby the slide valve is operated. For actuating said valve the shifter rod 101 is provided on its inner end with an enlarged head 102 received in a suitable socket 103 formed in an actuator 104 integral with or otherwise secured to a vertically shiftable rack sleeve 105 having the teeth thereof meshing with a rack pinion 106 carried by shaft 107 journaled in the walls of the housing 68. The pinion 106 is elongated to engage with rack teeth 108 formed on the outer end of the stem 109 of slide valve 72. From Figure 6 it will be seen that if the rack sleeve 105 were axially actuated, it will through the interengagement of its teeth with the pinion 106 rotate same and thereby shift the valve stem 109. It will also be seen by reference to this Figure that the rack sleeve 105 and valve stem 109 extend at right angles to one another.

The foregoing movement of the valve stem 109 is obtained by actuating the valve shift lever 101 through a horizontal plane on the ball support 100 while by moving said lever in a vertical plane will rotate the actuator 104 which through a ledge 110 formed thereon will engage and depress a pin 111 on one end of crank 112. This crank is secured to one end of rock shaft 113 oscillatably journaled in bearing 114 secured by any suitable or desirable means to the valve cage and the said rock shaft 113 carries on its other end a lever 115. This lever 115 bears against the outer end of slide rod 98 whereby the valve 94 is actuated away from its seat against the resistance of spring 97 to permit a rapid movement of the pistons 61 through the cylinders 58.

The distributor valve 77 has extending from it a stem 116 rotatably journaled in bearing 117 formed integral with the cap 99 and the said stem is prevented from longitudinal movement through the bearing 117 by a collar 118 secured thereto. An actuating knob 119 is secured to distributor value stem 116 for properly positioning the distributor value for the desired connections of the pressure and exhaust conduits. This actuator 119 is supplied with a suitable marker 120 cooperating with a dial or plate 121 carrying suitable indicia for indicating the operative coupling of either the regulating wheel trueing mechanism or the grinding wheel trueing mechanism individually with the hydraulic pressure source or for indicating the operative coupling of both of said trueing mechanisms simultaneously with the hydraulic pressure source.

The operation of the improved control mechanism should be readily apparent from the foregoing description and it will be noted that the mechanism is ready for instant use since the pump 64 is constantly actuated for maintaining the hydraulic source always at a given pressure which is held in check by the slide or reversing valve which need only be adjusted in one or the other direction to effect a corresponding flow of the pressure source. By positioning the distributor valve 77 relative to its housing in accordance with the indications on the dial 121 either or both of the trueing mechanisms may be operated.

While the distributor valve 77 is shown as having only four T-shaped ports, 78 to 81 inclusive, it is to be understood that any additional number of such ports may be provided or instead of having the T-shaped ports any other desirable configuration may be given the ports to thereby increase the number of outlets for each port and consequently the number of pistons controlled thereby. It is to be understood that the ports are to be properly spaced to selectively connect the pressure source therethrough to control the pistons individually or collectively as desired.

What is claimed is:

1. In a machine tool organization the combination of a bed, a plurality of movable units carried thereby for movement relative thereto, a piston for each unit, a cylinder for each piston, a source of hydraulic pressure, means for controlling the flow of the pressure source and for jointly and severally connecting the pressure with the cylinders, said means including a reversing valve and a distributor valve, a return conduit extending from each of the cylinders, means in the return conduit for controlling the rate of flow of the pressure, means for actuating the reversing valve, and means actuable by the reversing valve actuating means for rendering the rate of flow controlling means inoperative.

2. In a device of the class described the combination of a bed, a pair of rotating members carried thereby each having an active operative face, and means for simultaneously and individually trueing the said active faces comprising a trueing tool for each wheel, means for actuating each tool toward its wheel, means for actuating each tool across the face of its wheel, an hydraulic pressure source for effecting the several movements of each trueing tool, means controlling the hydraulic pressure source for individually and simultaneously actuating the several trueing mechanisms, said means comprising a reversing valve, and a distributing valve operatively coupled with the reversing valve for directing the hydraulic pressure source to the hydraulic mechanisms individually and collectively.

3. In a device of the class described the combination of a bed, a pair of rotating members carried thereby each having an active operative face, means for simultaneously and individually trueing the said active faces comprising a trueing tool for each wheel, means for actuating each tool toward its wheel, means for actuating each tool across the face of its wheel, an hydraulic pressure source for effecting the several movements of each trueing tool, means controlling the hydraulic pressure source for individually and simultaneously actuating the several trueing mechanisms, said means comprising a reversing valve and a distributing valve connected by conduits with the reversing valve for directing the hydraulic pressure source to the hydraulic mechanisms individually and collectively, and means controlling the rate of flow of the hydraulic pressure source to control the rate of movement of the trueing mechanisms.

4. In a device of the class described the combination of a bed, a pair of rotating members carried thereby each having an active operative face, means for simultaneously and individually trueing the said active faces comprising a trueing tool for actuating each tool toward its wheel, means for actuating each tool across the face of its wheel, an hydraulic pressure source for effecting the several movements of each trueing tool, means controlling the hydraulic pressure source for individually and simultaneously actuating the several trueing mechanisms, said means comprising a reversing valve and a distributing valve connected by conduits with the reversing valve for directing the hydraulic pressure source to the hydraulic mechanisms individually and collectively, means controlling the rate of flow of the hydraulic pressure source to control the rate of movement of the trueing mechanisms, and additional means for rendering the rate controlling means inoperative.

5. In a device of the class described the combination of a bed, a pair of opposed grinding and regulating wheels carried thereby and each having an active face, a trueing mechanism for each wheel, each mechanism comprising a trueing tool, a holder for the tool, means for feeding the holder and tool toward the active face of its wheel including a piston, means for traversing the holder and tool across the face of its wheel including a piston, an hydraulic pressure source, means connecting the pressure source with each piston, means reversing the flow of the pressure source through the connecting means, and means for adjusting the connecting means to determine the individual and joint connection of the trueing mechanisms with the pressure source.

6. In a device of the class described the combination of a bed, a pair of opposed grinding and regulating wheels carried thereby and each having an active face, a trueing mechanism for each wheel, each mechanism comprising a trueing tool, a holder for the tool, means for feeding the holder and tool toward the active face of its wheel including a piston, means for traversing the holder and tool across the face of its wheel including a piston, an hydraulic pressure source, means connecting the pressure source with each piston, means reversing the flow of the pressure source through the connecting means, means for adjusting the connecting means to determine the individual and joint connection of the trueing mechanisms with the pressure source, a return conduit from the traverse pistons, and means in said return conduit for determining the rate of flow therethrough and the rate of traverse movement of the trueing mechanisms.

7. In a device of the class described the combination of a bed, a pair of opposed grinding and regulating wheels carried thereby and each having an active face, a trueing mechanism for each wheel, each mechanism comprising a trueing tool, a holder for the tool, means for feeding the holder and tool toward the active face of its wheel including a piston, means for traversing the holder and tool across the face of its wheel including a piston, an hydraulic pressure source, means connecting the pressure source with each piston, means reversing the flow of the pressure source through the connecting means, means for adjusting the connecting means to determine the individual and joint connection of the trueing mechanisms with the pressure source, a return conduit from the traverse pistons, means in said return conduit for determining the rate of flow therethrough and the rate of traverse movement of the trueing mechanisms, and additional means for rendering the rate controlling means inoperative.

8. In a machine tool organization the combination of a bed, a plurality of slides mounted thereon for movement relative thereto, independent hydraulic means for effecting movement of each of said slides, an hydraulic circuit including an hydraulic medium for the slide actuating means, a valve in the circuit for reversing the flow thereof, a pre-selectable distributor valve for directing the hydraulic medium to either of the slide actuating means independently or to the two slides jointly, a valve in the circuit to control the rate of flow of the fluid from the slide actuating means to control the rate of speed thereof, and a valve actuating lever mounted for movement in planes at right angles to one another whereby the reversing valve is shifted when actuated in one plane and the rate control valve is rendered inoperative when the lever is shifted in the second plane.

9. In a machine tool organization the combination of a bed, a pair of slides mounted thereon for movement relative thereto, an hydraulically actuated motor associated with each slide for effecting its movement, an hydraulic circuit including an hydraulic medium for operating said motors, a reversing valve in the circuit for selectively directing the hydraulic medium to opposite ends of said motors, a revoluble pre-selectable distributor valve in said hydraulic circuit for selectively directing the hydraulic medium from the reversing valve to one or the other of the hydraulic motors for individual operation thereof or simultaneously to said motors for jointly operating same, an adjustable throttle valve in the return line from said motors for controlling the rate of flow therethrough and thereby control the rate of actuation of said motors, and a single lever operable in one plane for shifting the reversing valve and operable in a second plane for actuating the throttle valve.

10. In a control mechanism for a plurality of hydraulically actuated slides the combination of a bed supporting said slides, an hydraulic motor for each slide for effecting its operation, a valve casing secured to said bed, an hydraulic circuit including a pressure line and a pair of exhaust lines terminating at the valve casing, a reversing valve in said casing, a distributor valve in said casing, a pair of conduits extending from each motor and terminating at the valve casing, ports in said casing connecting the reversing valve with the pressure and exhaust conduits, ports in said casing connecting the reversing valve and distributor valve, ports connecting the distributor valve with the motor conduits, means for shifting the reversing valve to determine which of the ports to the distributor valve will be pressure and which exhaust, means for adjusting the distributor valve to determine the selective or joint actuation of the motors, an adjustable throttle valve in the casing controlling the flow through one of the exhaust ports from the reversing valve, and means for rendering the throttle valve inoperative.

11. In a control mechanism for a plurality of hydraulically actuated slides the combination of a bed supporting said slides, an hydraulic motor for each slide for effecting its operation, a valve casing secured to said bed, an hydraulic circuit including a pressure line and a pair of exhaust lines terminating at the valve casing, a reversing valve in said casing, a distributor valve in said casing, a pair of conduits extending from each motor and terminating at the valve casing, ports in said casing connecting the reversing valve with the pressure and exhaust conduits, ports in said casing connecting the reversing valve and distributor valve, ports connecting the distributor valve with the motor conduits, means for shifting the reversing valve to determine which of the ports to the distributor valve will be pressure and which exhaust, means for adjusting the distributor valve to determine the selective or joint actuation of the motors, an adjustable throttle valve in the casing controlling the flow through one of the exhaust ports from the reversing valve, and means for rendering the throttle valve inoperative, said means for shifting the reversing valve comprising a manually actuable lever having an operative connection with the reversing valve and the means for rendering the throttle valve inoperative being a coupling extending from said lever and operable thereby.

FREDERICK S. HAAS.